United States Patent

[11] 3,554,237

[72] Inventors Richard B. Pelley
East Kingston, N.H.;
James R. Warner, Groveland; George E.
Herbert, Haverhill, Mass.
[21] Appl. No. 717,307
[22] Filed Mar. 29, 1968
[45] Patented Jan. 12, 1971
[73] Assignee Callahan Mining Corporation
New York, N.Y.

[54] INSULATED WIRE-REINFORCED FLEXIBLE HOSE
8 Claims, 9 Drawing Figs.

[52] U.S. Cl............................................... 138/122,
138/129, 138/133, 138/144, 138/149, 138/153,
138/154; 242/7.23; 156/173
[51] Int. Cl.............................................. F16l 9/16
[50] Field of Search........................................... 138/118,
122, 124, 125, 126, 129, 132, 133, 134, 135, 136,
137, 138, 140, 141, 144, 145, 146, 153;
156/(Inquired), 173, 555; 242/(Inquired), 7.21,
7.22, 7.23

[56] References Cited
UNITED STATES PATENTS
3,112,771 12/1963 Bringolf....................... 138/129
3,189,053 6/1965 Parr............................. 138/138

Primary Examiner—Houston S. Bell, Jr.
Attorney—Blair, Buckles, Cesari and St. Onge ABSTRACT: The disclosed hose comprises an inner strip of insulating material laminated with heat reflective sheeting and covered with a flexible tape. The composite is wound into a hose with the lateral edges of consecutive tape convolutions overlapped and adhered together to form a helical seam. A helically deformed reinforcing wire is lodged in the helical seam just prior to its formation and a wear strip may be adhered thereover for abrasion resistance. The inner seam of the hose is sealed by a band of heat reflective material. The hose is manufactured by a continuous process in which the insulating strip, band, tape and wear strip are fed through a pressure guide which bonds them together, and the composite hose cover is then fed to hose forming apparatus.

INVENTORS
Richard B. Pelley
James R. Warner
George E. Herbert
BY
Blair Buckles Cesari & St. Onge
ATTORNEYS

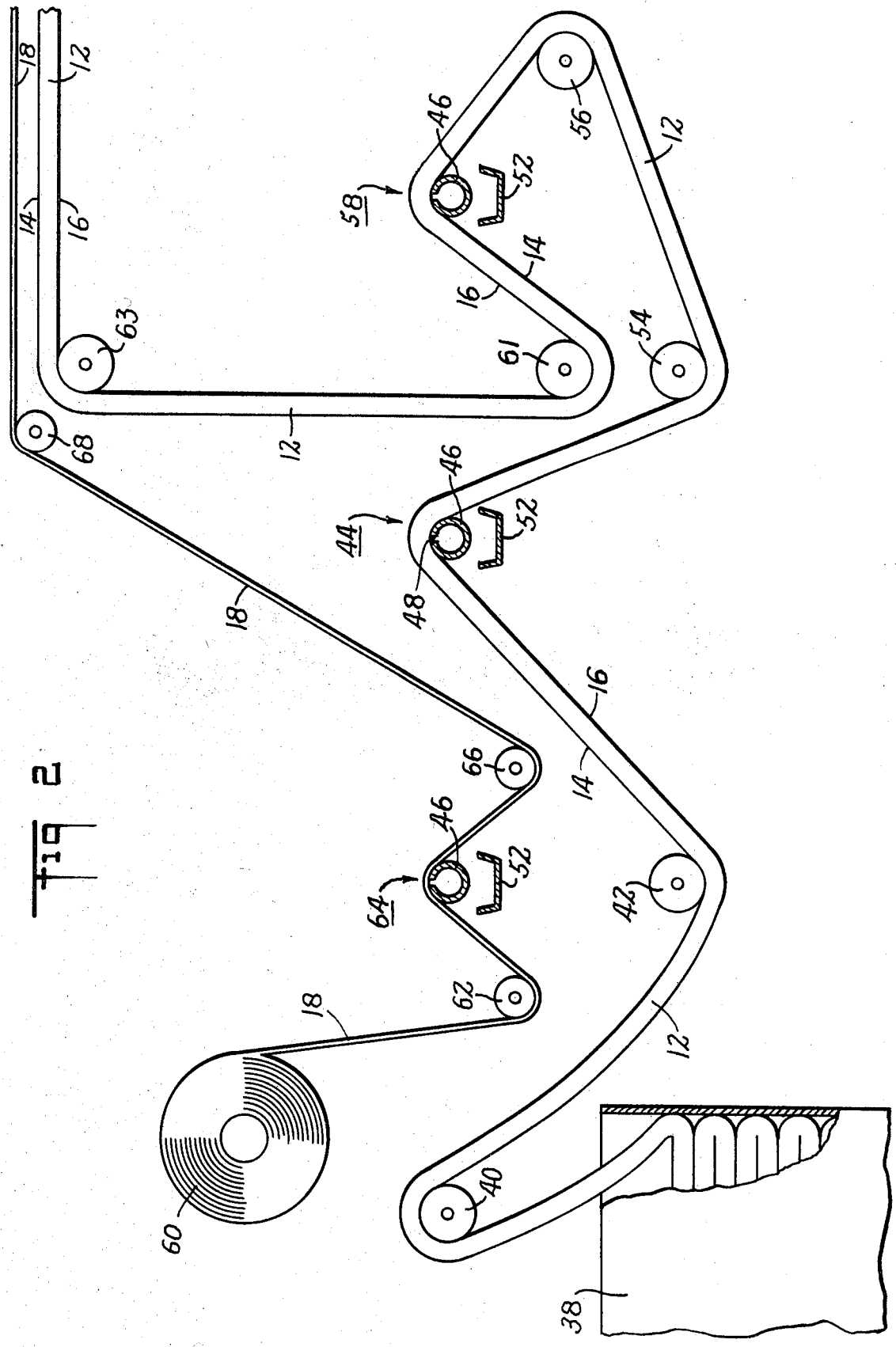

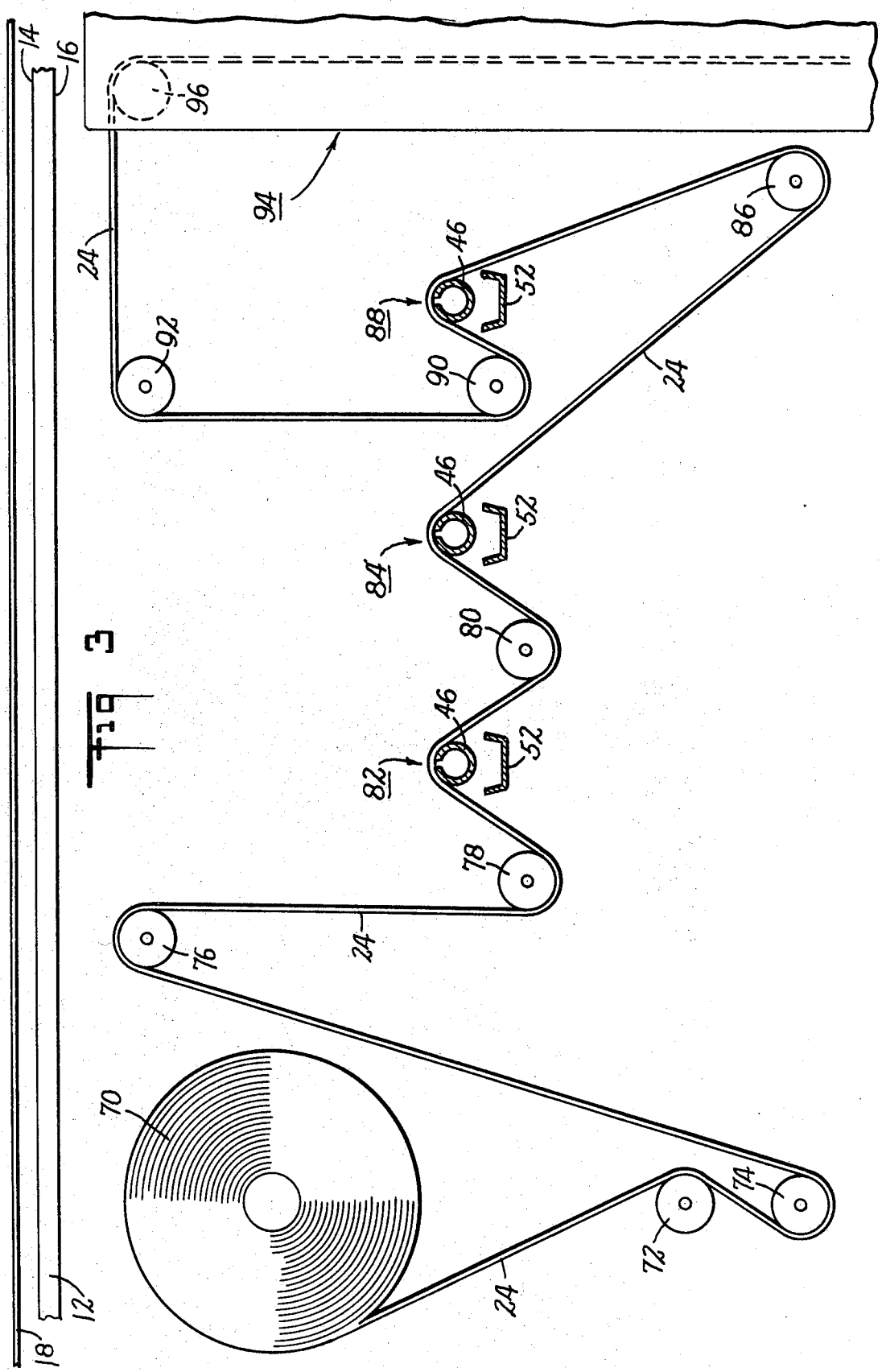

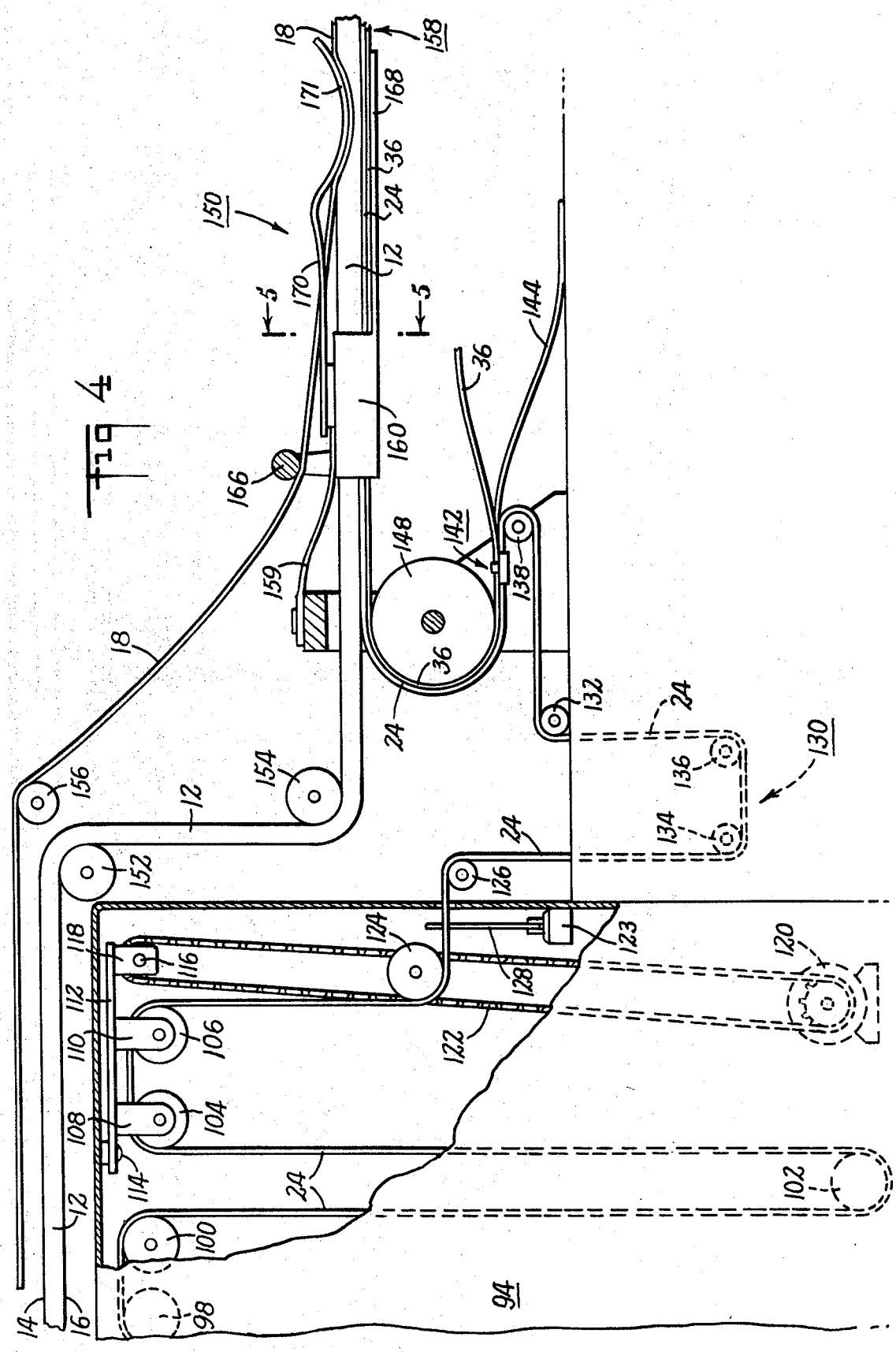

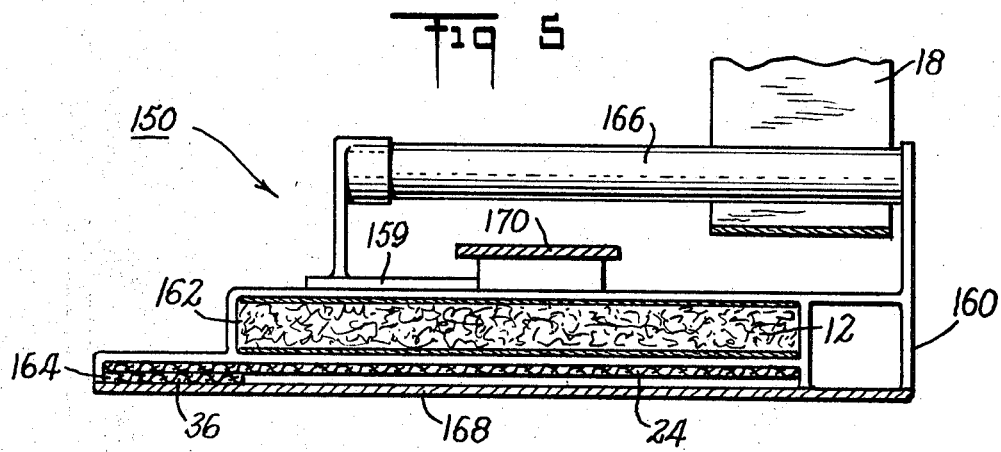
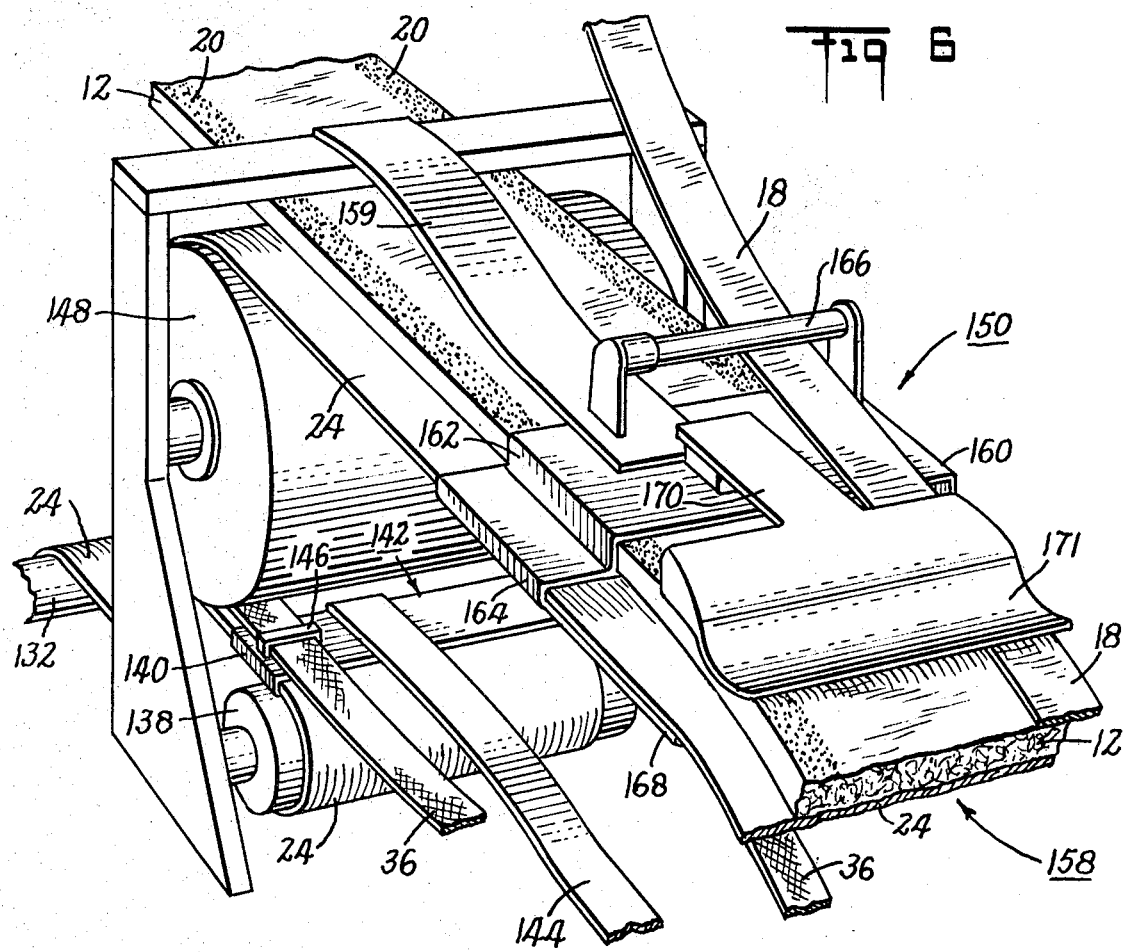

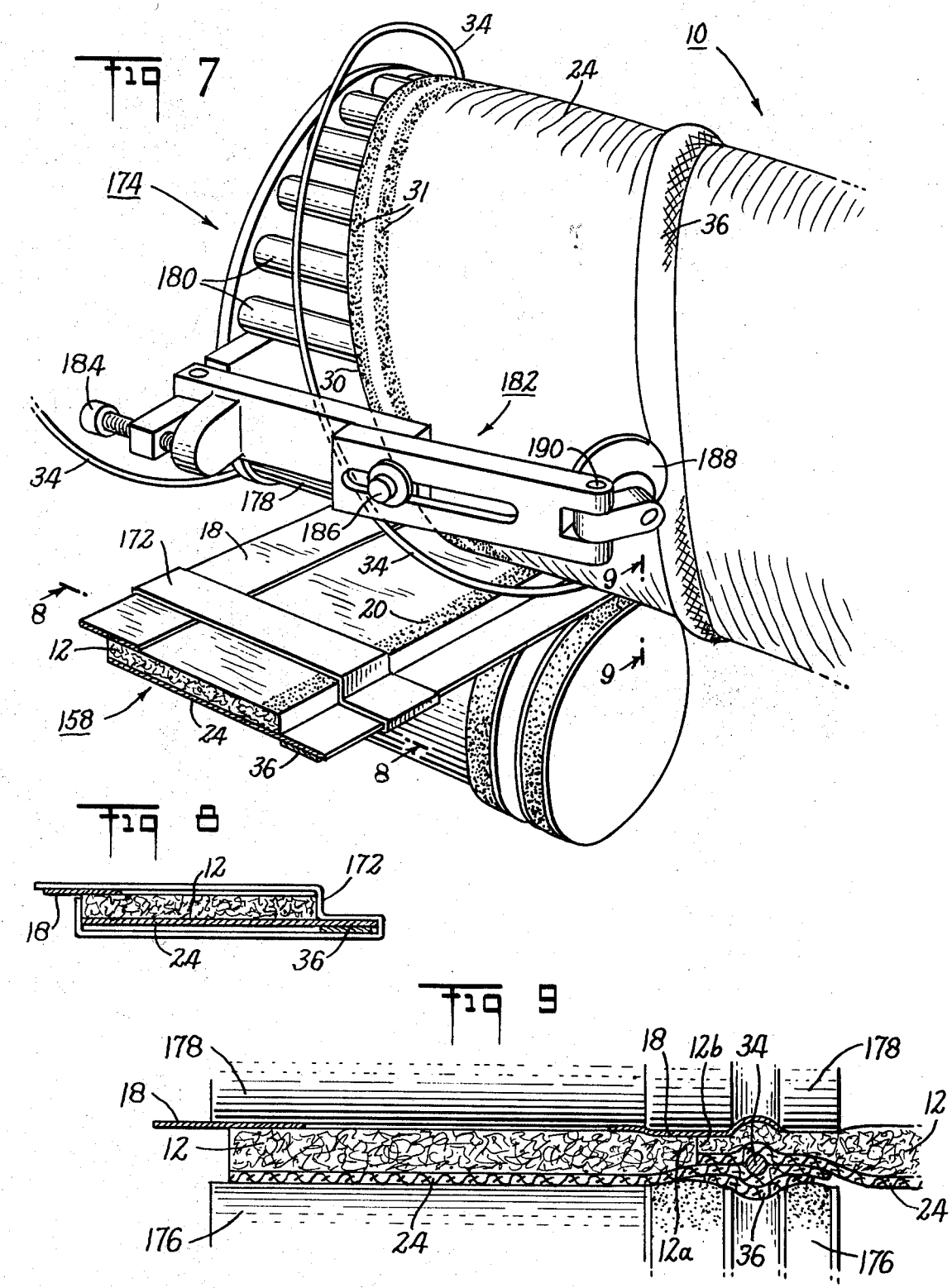

INSULATED WIRE-REINFORCED FLEXIBLE HOSE

BACKGROUND OF THE INVENTION

Wire-reinforced flexible hose is a product which is widely used for the conveyance of fluids, particularly gaseous fluids. It is especially attractive for use with portable equipment because of its light weight and ease of manipulation. Moreover, its length can be readily contracted to facilitate transport and storage. For these reasons and others it is often desirable to use flexible hose for the conveyance of fluids which must be maintained at temperatures above or below the ambient temperature. As an example, many of the recently developed inflatable building structures are held erect by filling them with heated air supplied from portable hot air blowers, and flexible hose provides an ideal means for conveying the heated air from the blower to the building interior. Flexible hose also makes an excellent means for conveying heated or cooled air to passenger aircraft in order to maintain the interior temperature at a comfortable level during stops when the internal air conditioning is turned off.

For such applications the flexible hose should be insulated to prevent or minimize heat transfer through the hose wall, and thus insure the proper fluid temperature at the hose outlet.

Insulated wire-reinforced flexible hose has been a difficult product to manufacture due to its relatively complex structure. Heretofore its manufacture has been largely a hand operation wherein the many separate components of the hose have been stitched together. As a result, prior art insulated hose has been prohibitively expensive, and the hand finished product has been rough and unattractive in appearance. In addition, it is extremely difficult to make airtight stitched seams, and the construction of prior art hose has been susceptible to ripping and unraveling since stitching weakens the hose wall.

Accordingly, representative objects of the present invention are to provide an insulated wire-reinforced flexible hose which can be machine made in a continuous operation and which is inexpensive to manufacture, durable, attractive in appearance and effective, and to provide a method and apparatus for the manufacture of such hose.

Other objects of the invention will in part be obvious and will in part appear hereinafter.

The invention accordingly comprises the several steps and the relation of one or more of such steps with respect to each of the others, the apparatus embodying features of construction, combination and arrangement of parts which are adapted to effect such steps, and the article which possesses the characteristics, properties and relation of elements, all as exemplified in the detailed disclosure hereinafter set forth, and the scope of the invention will be indicated in the claims.

SUMMARY OF THE INVENTION

The present invention relates to an insulated wire-reinforced flexible hose and the method and apparatus for making such hose.

The hose of the invention is formed of a plurality of helically wound and adhesively secured components to permit rapid and economical manufacture thereof in commercial quantities. The hose has excellent heat insulating qualities which suit it for the transfer of fluids which must be maintained above or below ambient temperature. A composite hose cover comprising an outer flexible tape adhesively secured to an inner strip of flexible heat insulating material is helically wound in a tubular shape. Consecutive convolutions of the outer tape are overlapped and adhesively secured to form a helical seam along the outer surface of the hose while consecutive convolutions of the inner layer of the heat insulating material abut at their adjacent edges to form an inner seam. The inner seam is preferably sealed with an adhesively secured band to insure that the heat insulating qualities of the hose are maintained. The helical seam along the outer surface of the hose may be protected with an abrasion resistant wear strip to protect the hose from wear due to scuffing and thus prolong the life of the hose in use. A helically deformed reinforcing wire is lodged in the helical seam produced by the outer tape to strengthen the hose wall and rigidify its structure for use in commercial applications.

The helically wound construction of the hose of the invention enables it to be continuously manufactured on a hose forming apparatus similar to that described in U.S. Pat. No. 3,336,172 which is assigned to the assignee of the present invention. Generally, the separate components forming the hose, except for the reinforcing wire, are continuously fed from their respective supplies and adhesively secured together by means of a novel pressure guide to form the composite hose cover. Concurrently, the reinforcing wire is drawn from a supply and deformed into a helix by the hose forming apparatus. The hose cover is then helically wound on the forming head of the hose forming apparatus and the deformed reinforcing wire is incorporated in the helical seam thereof to form the finished hose product.

BRIEF DESCRIPTION OF THE DRAWINGS

For a fuller understanding of the nature and objects of the invention, reference should be had to the following detailed description taken in connection with the accompanying drawings in which:

FIGS. 2, 3 and 4 are sequential, partially diagrammatic views illustrating steps in the method of the invention and apparatus for performing said steps;

FIG. 5 is a partial sectional view of the pressure guide of the invention taken along line 5–5 of FIG. 4;

FIG. 6 is an enlarged front perspective view of a portion of the apparatus shown in FIG. 4;

FIG. 7 is a front perspective view of the forming head of the apparatus used in making the insulated hose and in practicing the method of the invention;

FIG. 8 is a sectional view of the forming head guide taken along line 8–8 of FIG. 7;

FIG. 9 is an enlarged partial sectional view taken along line 9–9 of FIG. 7.

Similar reference characters refer to similar parts throughout the several views of the drawings.

DESCRIPTION OF THE PREFERRED EMBODIMENTS

Figure 1:
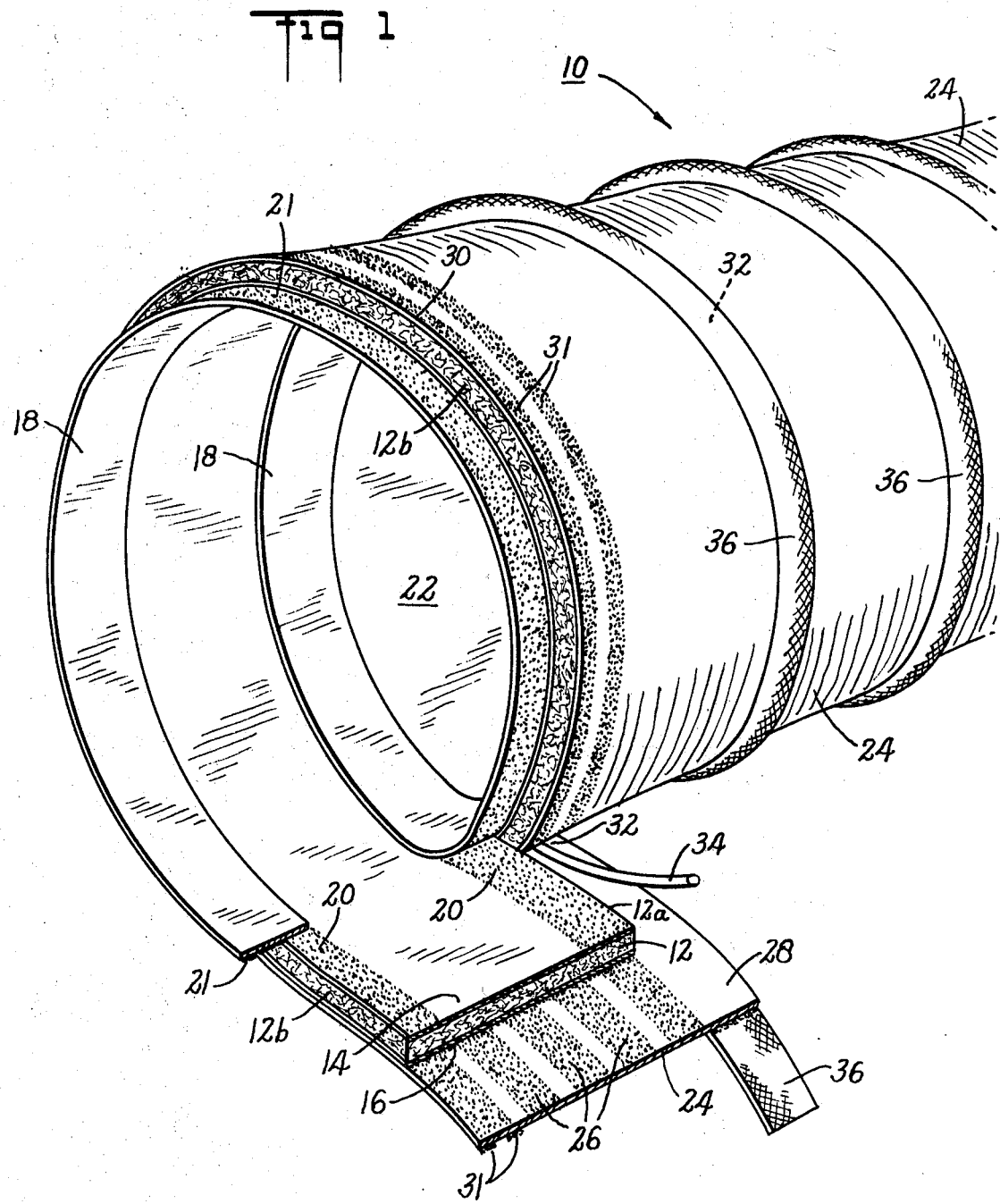
FIG. 1 is a perspective view of the insulated hose of the invention, partially disassembled to show the internal construction thereof.

Referring to FIG. 1, the hose 10 of the invention is formed of a composite of helically wound components, joined together in a manner which facilitates the continuous manufacture of such hose by machine.

A strip 12 of flexible heat insulating material, preferably a cellular resinous material such as open-cell polyurethane foam, is helically wound with the adjacent lateral edges 12a, 12b thereof in abutting relation to form an insulating tube. Preferably, at least the inner surface 14 and most preferably also outer surface 16 of insulating strip 12 is laminated with a heat reflective material more fully described below to enhance its heat insulating qualities. A separate sealing band 18 of substantially the same heat reflective material is secured by adhesive coatings 20 and 21 over abutting edges 12a and 12b of strip 12 at the inner surface 22 of hose 10 to perfect the insulating seal.

The outer surface of hose 10 comprises a flexible tape 24, helically wrapped about the insulating tube formed by strip 12 and secured by adhesive 26. An edge 28 of tape 24 overlaps the edge 30 of the previous convolution and is secured by adhesive 31 to form a helical seam 32 along hose 10. A helically deformed reinforcing wire 34 is incorporated in seam 32 between overlapping tape edges 28 and 30 to reinforce the hose wall. Seam 32 may further be covered with an abrasion resistant wear strip 36 secured by adhesive on the outer surface of tape 24 to prevent damage due to scuffing or dragging of the hose.

Referring now to FIG. 2, a continuous strip of flexible insulating material 12 is drawn from a supply container 38 wherein it may be folded for convenience in storage. Strip 12 is preferably a cellular resinous material of good heat insulating qualities such as open-cell polyurethane foam. At least the inner surface 14, and preferably also the outer surface 16 of strip 12 is covered with a heat reflective material, as seen in FIG. 1, to enhance the insulation qualities thereof. A particularly good heat reflective material is, for example, aluminized Mylar sheeting consisting of a continuous strip of Mylar having a thickness of approximately .00025 inch and coated on one side with a layer of aluminum approximately .000001 inch thick.

From supply 38 strip 12 is fed around a pair of guide rolls 40 and 42 and over an adhesive applicator 44 where adhesive, preferably of a pressure-sensitive variety, is applied to outer surface 16. Adhesive applicator 44 as well as the adhesive applicators subsequently disclosed may comprise a barrel 46 having one or more apertures 48 communicating with a hollow interior 50 through which adhesive may be forced under pressure by any appropriate means. The adhesive flowing through apertures 48 is thus picked up by strip 12 as it passes over applicator 44 and produces a thin coating on desired areas of the outer surface 16 thereof. A drip pan 52 may also be provided under each adhesive applicator to catch excess adhesive.

From applicator 44 strip 12 is passed around another pair of guide rolls 54 and 56 and thence over another adhesive applicator 58 where a coating of adhesive 20 (FIG. 1) is applied to inner surface 14 thereof. From adhesive applicator 58 strip 12 passes around yet another pair of guide rolls 61 and 63 which direct strip 12 to subsequent stages of the manufacturing process.

Still referring to FIG. 2, simultaneously with the application of adhesive to strip 12, adhesive is also applied to sealing band 18. Sealing band 18 is preferably formed of substantially the same reflective material which covers the surfaces of insulating strip 12. Thus, for example, a sealing band 18 consisting of a strip of Mylar approximately .0005 inch thick coated on each side with aluminum of a thickness of approximately .000001 inch has been found to be highly satisfactory.

Sealing band 18 is drawn from a supply roll 60 around a guide roll 62 and over an adhesive applicator 64 where a thin coating of adhesive 21 is applied to the surface of band 18 which will subsequently be bonded to inner surface 14 of insulating strip 12 as shown in FIG. 1. From adhesive applicator 64 band 18 is fed around a pair of guide rolls 66 and 68 which guide it to subsequent stages of the manufacturing process.

Referring now to FIG. 3, as the adhesively coated insulating strip 12 and sealing band 18 are fed overhead, a third component of the hose of the invention, flexible tape 24, is coated with adhesive. Tape 24 is fed from a supply roll 70 around a succession of guide rolls 72, 74, 76, 78 and 80 which guide the tape over a pair of adhesive applicators 82 and 84 where coatings of pressure-sensitive adhesive are applied to one surface. The adhesive applied by applicators 82 and 84 comprises coating 31 (FIG. 1) and the coating which is subsequently used to bond wear strip 36 to the hose surface. From applicator 84, tape 24 is fed around a single guide roll 86 and then over yet another adhesive applicator 88 where a coating of adhesive 26 (FIG. 1) is applied for subsequent bonding to the outer surface 16 of insulating strip 12. From applicator 88 strip 24 is then fed around a pair of guide rolls 90 and 92 and into a drying cabinet 94 which is shown more completely in FIG. 4.

The function of drying cabinet 94 is to provide an extended path of travel for flexible tape 24 so that the adhesive thereon will have time to dry sufficiently to form the strong bond required to secure the separate hose components when they are assembled into the final hose product. Accordingly, alternate rollers or roller pairs such as 96—102 are mounted adjacent the top and bottom of cabinet 94 to guide tape 24 in a plurality of looping paths through the cabinet interior as shown in FIGS. 3 and 4. Cabinet 94 may also be heated in any suitable manner to accelerate the process of drying strip 24.

In its passage up to and through cabinet 94 there is a tendency for strip 24 to become misaligned relative to subsequent processing apparatus as it travels over the many rolls which guide it through the various stages of manufacture. To counteract this tendency, alignment means are provided to realign strip 24 just prior to its exits from cabinet 94. Referring to FIG. 4, a pair of rollers 104 and 106 adjacent the top of cabinet 94 are journaled on supports 108 and 110 which in turn are fixed to a pivoting plate 112. Plate 112 is pivotally mounted by pin 114 to the top of cabinet 94. A feed screw 116 journaled to the sidewall of cabinet 94 at one end, threadedly engages a boss 118 depending from plate 112. It will be seen that rotation of drive screw 116 will cause plate 112 to pivot in or out of the plane of FIG. 4, thus providing a means for bringing tape 24 into alignment with apparatus performing subsequent steps.

Drive screw 116 may be manually o controlled; however, it is preferably driven by a motor 120 which is connected to screw 116 through a drive chain or belt 122. The actuation and direction of rotation of motor 120 is controlled by a pair of limit switches 123 (only one shown) positioned adjacent the point where tape 24 exits cabinet 94 around guide rollers 124 and 126. A pair of switch arms 128 each connected to one limit switch 123 straddle the outer edges of tape 24. Excessive lateral movement of tape 24 will thus move one switch arm 128 to actuate motor 120 through limit switch 123 and thereby realign tape 24 through a correcting movement of pivoting plate 112.

Upon leaving cabinet 94, tape 24 passes over a tracking mechanism 130 which consists of roller 126 and a similar upper roller 132, and a pair of lower rollers 134 and 136. The upper and lower rollers 126, 134 may be laterally offset from upper and lower rollers 132, 136 to provide the necessary lateral adjustment of tape 24 when the apparatus beyond cabinet 94 is not aligned therewith.

From tracking mechanism 130, tape 24 is fed around a roll 138 while wear strip 36 is applied thereto as shown in FIG. 6. Tape 24, as it rounds roller 138, is fed through the lower channel 140 of a guide 142 supported by an arm 144. Wear strip 36 is drawn from a supply (not shown) through an upper channel 146 on guide 142 which aligns it with the outer surface of the tape 24 adjacent edge 28 as shown in FIG. 1. Tape 24 and wear strip 36 are then fed around a large guide roll 148 whereby sufficient pressure is exerted between the contacting surfaces of tape 24 and strip 36 to cause adhesion.

The adhered tape 24 and strip 36 are then fed into a pressure guide 150 (FIG. 4). Simultaneously, insulating strip 12 is fed around a pair of guide rolls 152 and 154 and into pressure guide 150 while sealing band 18 is fed around guide roll 156 and into pressure guide 150. These four components, strip 12, sealing band 18, tape 24, and wear strip 36 are suitably aligned and progressively pressed together by pressure guide 150 to adhesively join them in forming a composite hose cover 158.

Referring to FIGS. 4 and 5, pressure guide 150 is supported adjacent roll 148 at the end of an arm 159 and comprises a channel member 160 having a first channel 162 for guiding and aligning insulating strip 12. A second channel 164 positioned below channel 162 guides and aligns tape 24 and strip 36 relative to insulating strip 12 as the components move through channel member 160. A guide bar 166 supported on top of channel member 160 directs sealing band 18 over pressure guide 150 and into contact with the other components of the hose. After respectively passing through channel member 160 or under bar 166, the components of composite hose cover 158 are supported on an anvil 168 projecting from the front of channel member 160 (FIG. 4). A pressure member 170 formed of a material such as spring steel and having a broad, arcuately deformed end 171 projects from the top of channel member 160 over anvil 168. End 171 serves to press the components of hose cover 158 against anvil 168 as they pass therebetween and thereby effects adhesion between their contacting adhesive coated surfaces.

Referring now to FIG. 7, from pressure guide 150 the composite hose cover 158 is fed through a channellike forming-head guide 172 (FIG. 8) and into the forming head 174 of a hose forming apparatus.

The hose forming apparatus used in making the insulated hose of the invention is substantially identical, except for slight modifications in the forming head discussed below, to the apparatus disclosed in U.S. Pat. No. 3,336,172 assigned to the assignee of the present invention. Accordingly, the disclosure of that patent insofar as it is not inconsistent with the present disclosure is incorporated herein by reference.

From guide 172, composite hose cover 158 is fed between the hose forming rolls 176 and 178 (FIGS. 7 and 9) of forming head 174 and then looped around a plurality of supporting rollers 180. Rollers 180 are mounted in circumferentially spaced relationship on forming head 174 as shown in FIG. 7, and serve to support the looped hose cover 158 and control the diameter of the finished hose product. After looping around the rollers 180, hose cover 158 is again fed between rollers 176 and 178 with the edges of tape 24 in overlapping relation. Simultaneously, reinforcing wire 34, which has previously been plastically deformed into a helix in the manner disclosed in U.S. Pat. No. 3,336,172, is fed into the nip between the overlapping portions of hose cover 158, that is, between edge 28 and adjacent edge 30 of the previous convolution (see FIG. 1).

The desired degree of overlap between succeeding convolutions of hose cover 158 as it loops around rollers 180 and between forming rolls 176 and 178 is achieved by means of a biasing roller 182.

In order to perform its function, biasing roller 182 is positioned on forming head 174 to bear against the reinforcing wire in helical seam 32 of insulated hose 10 as shown in FIG. 7 in such a manner as to cause composite hose cover 158 to be directed in a helical path around forming head 174. For this purpose, biasing roller 182 is made angularly adjustable by an adjustment screw 184 and adjustable in length through a bolt 186 in order to accommodate hose of different diameters and pitches. In addition, the roller head 188 of biasing roller 182 is pivotable about a pin 190 to change the angle of inclination thereof with respect to helical seam 32.

As shown in FIG. 9, as the overlapped portions of composite hose cover 158 are fed between forming rolls 176 and 178 they are compressed about reinforcing wire 34 and thus caused to adhere through the preapplied adhesive coating 31 (FIG. 1). Accordingly, a finished hose 10 in accordance with the invention is continuously fed from the end of forming head 174 as shown in FIG. 7.

Thus, by means of the apparatus and method disclosed, we are able to continuously manufacture the insulated wire-reinforced flexible hose of the invention in a continuous operation, and to produce a hose product which is inexpensively made, durable, attractive and extremely effective for the conveyance of heated or cooled gases.

It will thus be seen that the objects set forth above, among those made apparent from the preceding description, are efficiently attained and, since certain changes may be made in carrying out the above process, in the described product, and in the constructions set forth without departing from the scope of the invention, it is intended that all matter contained in the above description shall be interpreted as illustrative and not in a limiting sense.

It is also to be understood that the following claims are intended to cover all of the generic and specific features of the invention which, as a matter of language, might be said to fall therebetween.

We claim:

1. An insulated, wire-reinforced flexible hose comprising, in combination:
   A. an elongated strip of flexible heat insulating material having a heat reflective layer on at least one surface thereof;
      1. said strip being helically wound into an insulating tube with the lateral edges of adjacent convolutions thereof in substantially continuous edge-abutting relationship to form a first helical seam, and with said heat reflective layer on at least the inner surface of said insulating tube,
   B. a flexible tape;
      1. helically wrapped about said insulating tube
      2. with the adjacent edges of consecutive convolutions overlapped and adhesively secured together to form a second continuous helical seam coextensive with said first helical seam, and
   C. a reinforcing wire;
      1. incorporated in said second helical seam between said overlapped edges of said tape.

2. A hose as defined in claim 1 wherein said strip is a cellular resinous material.

3. A hose as defined in claim 2 wherein said cellular resinous material is open-cell polyurethane foam.

4. A hose as defined in claim 1 including means sealing the abutting lateral edges of said insulating material along the inner surface of the hose.

5. A hose as defined in claim 4 wherein said means comprises a reflectively coated flexible sealing band adhesively secured over the abutting lateral edges of said insulating material along the inner surface of the hose.

6. A hose as defined in claim 1 including an abrasion resistant wear strip secured over said helical seam.

7. An insulated, wire-reinforced flexible hose comprising, in combination:
   A. a flexible elongated strip of cellular resinous heat insulating material;
      1. sandwiched between thin layers of reflectively coated flexible sheeting, and
      2. helically wound into an insulating tube with the lateral edges of adjacent convolutions thereof in substantially continuous edge-abutting relationship,
   B. a reflectively coated flexible sealing band;
      1. adhesively secured over the abutting lateral edges of said insulating material to form a first helical seam along the inner surface of said tube,
   C. a flexible tape;
      1. helically wrapped about and adhered to said insulating tube with the adjacent edges of consecutive convolutions thereof,
         a. continuously overlapped, and
         b. adhesively secured together to form a second helical seam coextensive with and in contiguous relation to said first helical seam, and 8. An insulated, wire-reinforced flexible hose comprising, in combination:
   A. an elongated strip of flexible insulating material having at least one surface covered with tough flexible sheeting;
      1. said strip being helically wound into an insulating tube with the lateral edges of adjacent convolutions thereof in substantially continuous edge-abutting relationship to form a first helical seam, and with said flexible sheeting on at least the inner surface of said insulating tube,
   B. a flexible tape;
      1. helically wrapped about said insulating tube
      2. with the adjacent edges of consecutive convolutions overlapped and adhesively secured together to form a second continuous helical seam coextensive with said first helical seam, and
   C. a reinforcing wire;
      1. incorporated in said second helical seam between said overlapped edges of said tape.
   D. a reinforcing wire;
      1. plastically deformed to a helical shape, and
      2. incorporated in said second helical seam between said overlapped tape edges.